Feb. 28, 1928.
J. E. ROWE
1,661,095
CALCULATING INSTRUMENT
Filed May 1. 1926
2 Sheets-Sheet 1
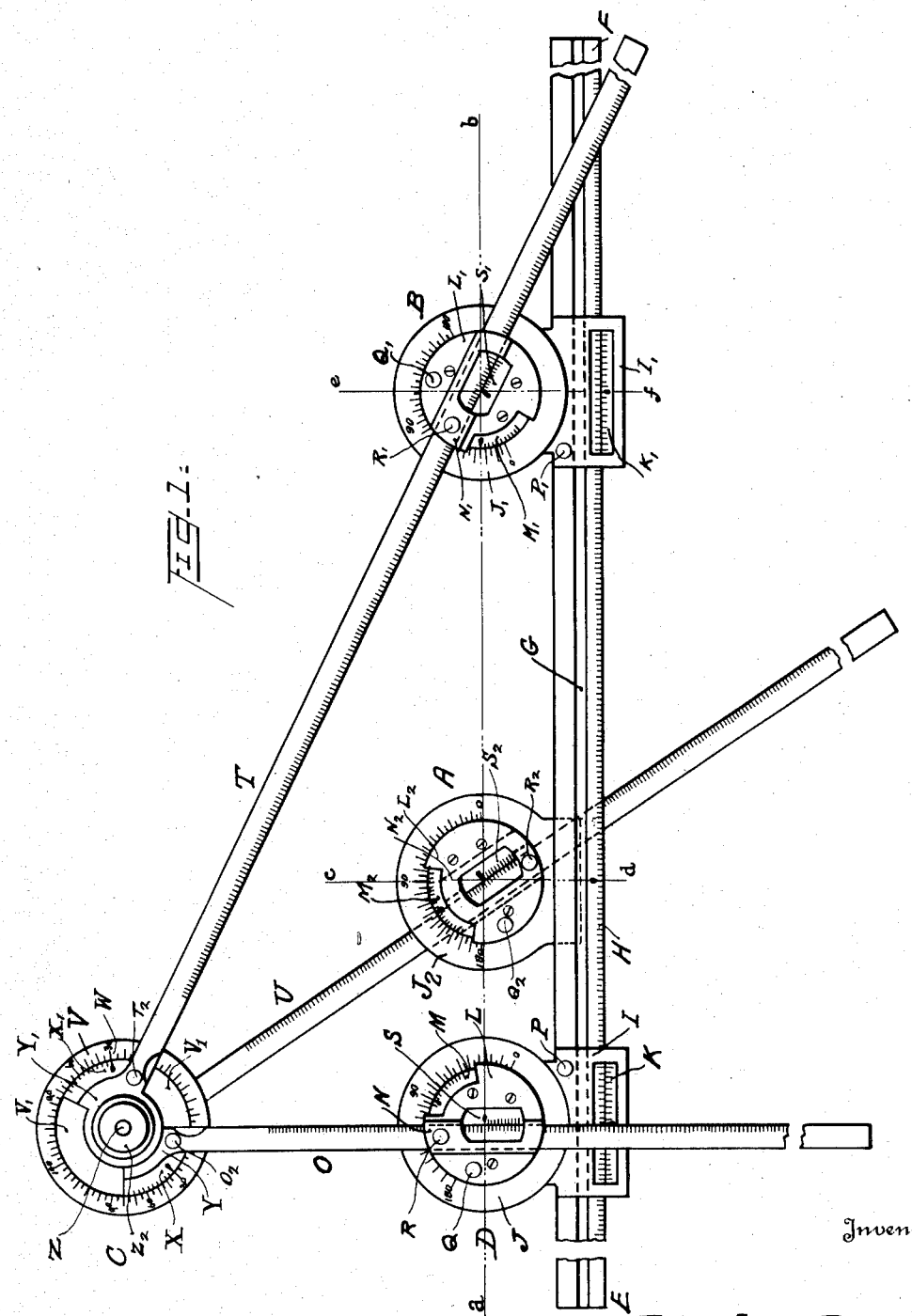
Inventor
Joseph Eugene Rowe.
By Arthur Scrivenor.
Attorney

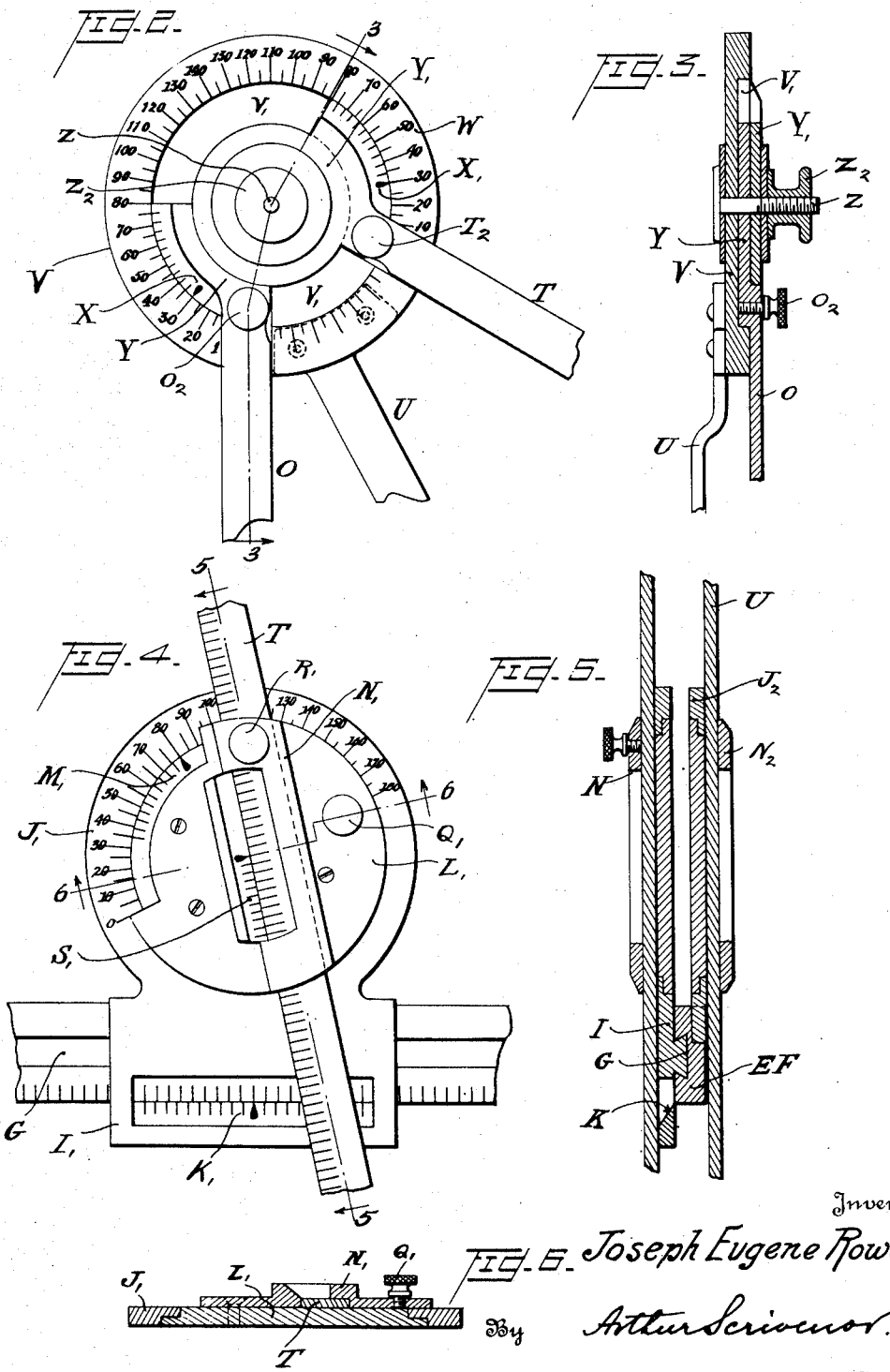

Patented Feb. 28, 1928.

1,661,095

UNITED STATES PATENT OFFICE.

JOSEPH EUGENE ROWE, OF WILLIAMSBURG, VIRGINIA.

CALCULATING INSTRUMENT.

Application filed May 1, 1926. Serial No. 106,044.

My invention relates to instruments for solving mathematical problems, and for use in surveying, range finding, etc.; and the particular object of my invention is to provide an instrument by which plane triangles of all descriptions may be rapidly and accurately solved, their areas and altitudes found, and arithmetical operations depending upon the similarity of triangles rapidly performed.

It is also my object to produce an instrument such that if any three determining parts of a triangle are set, the other parts of the said triangle may be at once read.

It is further the object of my invention not only to simplify calculations in practical engineering, but also to simplify and humanize the teaching of mathematics.

Some of the uses for my instrument in practical engineering are the automatic solution of triangles in ordinary surveying; finding the area of any triangle as the product of the base and half altitude; the automatic solution of all sextant problems, such as finding the altitude and distance of a visible object; range finding both on land and sea; and in the rapid solution of trigonometrical equations and the finding of the six trigonometric functions of any angle.

In simplifying the teaching of mathematics it enables one to combine the arts of plane geometry and trigonometry under one subject head, which I term trigonometry; and in such a manner that any problem in geometry involving triangles may be presented by the instructor in a very attractive way; and so that the truth of the solution of a problem is at once seen by the student. With the use of my trinometer it will be possible to cover more ground in mathematics in a given time; and it will aid the student in acquiring in a shorter time a thorough understanding of the science.

Among the arithmetical operations which my trinometer may be used to perform are the multiplication of two numbers, the division of one number by another; extracting the square root of a number; and, in fact, many arithmetical processes that can be made dependent upon similarity of triangles.

Referring to the drawings, which form a part of this specification: Figure 1 shows a plan of my trinometer; Figure 2 is a detail showing in plan the head of the instrument; Figure 3 is a section of the head shown in Figure 2; Figure 4 shows in detail one of the sliding members of the instrument; Figure 5 is a cross section of the instrument taken on the line 5—5 in Figure 4; and Figure 6 is a cross section taken on line 6—6 in Figure 4.

In Figure 1, E—F, is a straight bar having on one side the beveled slot G. One of the edges of this bar, for convenience the lower one, is graduated as shown at H. In some cases I graduate the upper edge of the bar, as described later. Sliding upon the bar E—F, which for the sake of brevity I refer to as the "base-bar", is the mechanism D; which consists of a plate I, on the upper part of which is mounted a protractor J, and on the lower part of which is engraved a vernier scale K arranged to ride against the graduated edge of the base-bar. Mounted within and concentrically with the protractor J is a revolving plate L, to which is attached a vernier M which lies against the scale engraved on the circular limb of the protractor J. On the revolving plate L is mounted the sheath N through which slides a scale-arm O. The graduated side of the scale-arm O passes directly through the center of the axis of the revolving plate L; and on the said plate L there is engraved a vernier S which lies against the graduated scale-arm O. The movement of the slide I along the base-bar is controlled by the screw P; the revolution of the plate L in the protractor is governed by the screw Q, and the sliding of the scale-arm O through the sheath N is governed by the screw R. On the sliding vernier K the zero is located exactly under the center of the protractor J. The zero of the vernier S is located directly on the center of the protractor J. The zero of the vernier M is located on the 90 degree graduation of the protractor J. It will be noted that the 90 degree graduation is to one side of the vertical, so as to clear the edge of the sheath N.

At B is shown a mechanism similar to that shown at D, except that the protractor is graduated clockwise, whereas the protractor in D is graduated anti-clockwise. In the mechanism B the various details are indicated by letters like those used to indicate the details in D, but with a prime added; except that the scale-arm which passes through the sheath $N_1$ is indicated by the letter T.

This arm it will be seen is graduated on its left hand side; which side passes through the center of the protractor $J_1$.

At A is a third protractor $J_2$ similar in most of its details to the protractors at D and B. In this case the scale-arm U lies against the rear face of the protractor; and the zero of the vernier $M_2$ is arranged on the center line of the revolving plate $L_2$, so that when it coincides with the 90 degree graduation of the protractor, the scale-arm U sliding through the sheath $N_2$ will be at right angles to the base-bar E—F.

In Figures 1 and 5 the protractor $J_2$ is shown fixed on the back of the base-bar EF; and the zero of the scale H is marked exactly below the center of the protractor $J_2$; both zero and center lying on the dotted line c—d. In some instruments for special purposes it is preferred to make the protractor $J_2$ slidable on the rear of the base-bar; with means for fixing it in any desired position on the base-bar. This construction is described and claimed in a separate application filed May 9, 1927, Serial Number 189,882, entitled Mathematical instruments.

The centers of each of the three protractors J, $J_1$ and $J_2$, and the centers of each of the three revolving plates L, $L_1$, and $L_2$ are on the line a—b, and are at the same distance from the base-bar E—F. In Figure 1 the base of the triangle CDB lies between the centers of protractors J and $J_1$ and passes through the center of protractor $J_2$. That is, the base of the triangle connects the three centers; and it is projected to the scale H for measurement.

The graduated edges of scale-arms O, U and T, which pass through the centers of protractors J, and $J_2$, and $J_1$, respectively, converge towards the head C; and if projected would pass directly through the center of the pivot of the head C. This head C consists of a disc or protractor V, on which is engraved a scale W. The space within this scale W is countersunk, as at $V_1$, so that the graduations of the verniers X and $X_1$, which are engraved on the heads Y and $Y_1$, of the scale-arms O and T, may abut against, rather than overlap, the graduations on scale W. The central portions of the heads Y and $Y_1$ are fitted together in the usual way on the pivot Z, as shown in Figures 2 and 3, so that the scale-arms O and T, and their head verniers X and $X_1$, may lie in the same plane. The movement of arms O and T about the pivot Z may be locked by means of the screws $O_2$, $T_2$. Movement of O and T may also be controlled by the clamping nut $Z_2$, which engages the threaded end of the pivot Z; as shown in Figure 3.

The upper end of the scale-arm U may be made integral with the protractor V; or it may terminate in a head which is riveted or screwed to the protractor V, as shown in Figures 2 and 3. I do not limit the attachment of arm U to protractor V to the rigid form, for it may for certain uses be found to be more convenient to pivot the scale-arm U on the back of the protractor V, controlling its movement with respect to protractor V by means of a setting screw in the usual way.

The protractor $J_2$ is graduated so that the 90 degree division lies on a line at right angles to the base-bar E—F; and the zero of the vernier $M_2$ lies on the same line when the scale-arm U is at right angles to the base-bar E—F. On protractors J and $J_1$ the 90 degree divisions are to the right and left, respectively, of the line at right angles to the base-bar, because the zeros of the verniers M and $M_1$ must not be hidden by the sheaths N and $N_1$, which are on the fronts or near sides of the plates L and $L_1$, respectively. On the protractor V the zeros of the circular scale W are located so that the zeros on the verniers X and $X_1$ on the heads Y and $Y_1$ of scale arms O and T will register with them when the graduated edges of the scale-arms O and T coincide with the graduated edge of the scale-arm U. Consequently the reading of the vernier X will give the angle between scale-arms O and U; and the reading of the vernier $X_1$ will give the angle between scale-arms T and U. The sum of these two readings will give the angle between the scale-arms O and T.

In describing the use of my trinometer it will be convenient to designate the center of the pivot Z as C, the center of the protractor J as D, the center of the protractor $J_2$ as A, and the center of the protractor $J_1$ as B. Referring to Figure 1: we then have a triangle DCB, with base DB; a triangle DCA, with base DA; and a triangle ACB, with base AB.

To measure the altitude and the area of triangle ACB, and to determine the three angles, the three sides having been given: first the clamping screws Q, R, $Q_1$, $R_1$, $Q_2$, $R_2$, P, $P_1$ and $O_2$, $T_2$, are loosened; the scale-arm U is slid through the sheath $N_2$ until the distance CA is equivalent to the length of a side of the triangle, and clamping screw $R_2$ clamps it in place in the sheath $N_2$; the scale-arm T is slid through sheath $N_1$ until CB is equivalent to the length of the other side of the triangle, and clamping screw $R_1$ holds it in place; mechanism B is slid along the base-bar until AB is equivalent to the length of the base of the triangle, and clamp $P_1$ holds it in place. As these operations are performed, the scale-arm T will pivot on Z, the plate $L_2$ will turn in protractor $J_2$, and plate $L_1$ will turn in protractor $J_1$. We now have the triangle with the three given sides; and we can read the angle ACB on vernier $X_1$, the angle ABC on vernier $M_1$, and angle CAB on vernier $M_2$. The mechanism D is now slid on the base-bar until vernier M reads 90 degrees, when the arm O will be at right angles to the base bar E—F, and to DB. The reading CD on vernier S is then the equivalent of the altitude; and the area of the triangle CAB equals ABxCD/2.

If the triangle CAB has three acute angles the altitude CD will intersect the base AB. In constructing the triangle CAB the mechanism D will slide along the base-bar E—F past the mechanism A until it lies at a point on the base-bar between A and B.

In constructing similar right triangles we can proceed in two ways. If the scale-arm U is used as the common side, it is swung until the zero of vernier $M_2$ reads on 90 degrees of the protractor $J_2$. Clamping screw $Q_2$ is then locked. The arm U is then slid through sheath $N_2$ until CA is equivalent to the length of the side common to the two triangles. If the bases of the two similar triangles are given, then the mechanisms D and B are slid on the base-bar, D to the left and B to the right, until DA and AB are equivalent to the lengths of the two bases. CD and CB will then be equivalent to the lengths of the two hypotenuses; and we can read the several acute angles on verniers X, $X_1$, M and $M_1$. If the scale-arm O is used as the common side, the mechanism D is slid to the right of mechanism A; and AD and DB are made equivalent to the lengths of the two bases. Scale-arm O is then swung until vernier M reads 90 degrees on protractor J; and arm O is slid through sheath N until CD is equal to the equivalent of the length of the common side, the length being read on vernier S. The several acute angles may then be read on verniers X, $X_1$, $M_2$, and $M_1$, and the lengths of the two hypotenuses on scale-arms U and T.

If the angles of similar triangles are given, we may select one of the scale-arms, as U, for the common side, and set the vernier $M_2$ to read the angles enclosed by the common side, and the bases. We then set mechanism D away from mechanism A a distance so that DA will equal the length of one of the bases to any assumed scale. Scale-arm U is now slid through sheath $N_2$ until angle CDA equals the angle to be enclosed by base DA and side DC. Similarly, mechanism B is slid away from A until the angle CBA is equal to the angle to be enclosed by base AB and the side BC. The angles DCA and BCA may then be read on verniers X and $X_1$; and the lengths of the sides DC, and BC, and AC, may be read on scale-arms O, T and U respectively, and the lengths of the two bases on scale H, to the scale selected when assuming the length of the base DA.

Another example in similar triangles, the angles CAB of one triangle being given, may be constructed as follows. Slide arm U through sheath $N_2$ to make CA of any length, and forming given angle CAB with the base line a—b. Swing arm T on pivot Z to form given angle ACB; read on vernier $X_1$. Clamp screw $T_2$. As arm T is swung on Z, mechanism B will slide to its place on base-bar E—F, forming base AB and the remaining given angle ABC. Now swing arm O on pivot Z, at the same time sliding mechanism D on base-bar E—F, until the sum of the readings of vernier $X_1$ (which is now fixed by clamp $T_2$) and vernier X equals the reading of angle CAB on vernier $M_2$. Angle CDB will then be equal to angle ACB, which is true because angle DBC is common to the similar triangles CAB and DCB.

If it be required to find the height of and the distance to an inaccessible object, the summit of which we will designate as $S_3$; loosen all clamping screws on the instrument, and place the bar E—F in a horizontal position (which may be checked with a bubble), with the scale-arms O, U, T in a vertical plane. Sight on $S_3$ over the edge of arm U, and fix the revolution of U about A by means of clamping screw $Q_2$. Move a convenient distance back to a second point of observation, and slide mechanism B along the base-bar E—F so that AB will be equivalent to the distance between the two points of observation, and secure B by clamping screw $P_1$. Slide U through sheath $N_2$; and at the same time slide arm T in sheath $N_1$, and also rotate T about B, until $S_3$ is sighted along the edge of arm T. Set clamping screw $Q_1$. This fixes the triangle ABC. Now slide mechanism D along the base-bar E—F, allowing arm O to pivot on Z and also to slide in sheath N, until arm O is perpendicular to the base-bar E—F, reading on vernier M. Then CD is the height of the distant object; and AD and BD are its horizontal distances from the first and second points of observation, respectively. For convenience in sighting, sights of equal height may be clipped onto the arms U and T; and for extreme accuracy in the field telescopic sights may be used in the same way.

From the foregoing descriptions of solutions of triangles on my trinometer, it will be seen that other problems may be solved. For instance: the solution of a triangle, having given two sides and the included angle, or two angles and the included side; or three sides; or two sides and the angle opposite one of them.

To illustrate the extraction of a square root, of any number, $n$, set arm U at right angles to a—b; slide mechanism B until AB is equal to $n$. Then slide mechanism D until AD is equal to unity, to the same scale at $n$. With these two lengths now fixed, slide arm U through sheath $N_2$ until the angle DCB is 90 degrees. Then the length AC is the desired square root; for, by similar triangles, $AC^2 = AB \times AD = n \times 1$; and therefore $AC = \sqrt{n}$. To square a number $n$, the arm U is adjusted to make AC equal to $n$ and AD is made equal to unity to the same scale; then swing T on pivot Z until DCB is 90 degrees. Then AB is equal to $n^2$; for, by similar triangles, $1 \times AB = AC^2$, or $AB = n^2$.

The natural trigonometrical functions of all acute angles may also be found on the trinometer. To illustrate: Swing arm U to the 90 degree position, and set clamping screw $Q_2$. Make BC equal to any tens of units by sliding arm T in sheath $N_1$, and set clamping screw $R_1$. Angle CAB and side BC are now fixed. Now form different values of angle ABC by sliding arm U in sheath $N_2$, at the same time sliding mechanism B along the base-bar. For each value of angle ABC, AC and AB will give the values of the corresponding sine and cosine, respectively. To obtain tangents and secants; fix AB equal to any tens of units, and set U at right angles to AB. Obtain different angles ABC by sliding arm U in sheath $N_2$, and by sliding arm T in sheath $N_1$, at the same time rotating arm T on pivot Z and about B. For each value of angle ABC, AC will give the tangent, and BC the secant of angle ABC. To obtain cotangents and cosecants; fix AC equal to any tens of units. Slide mechanism B on the base-bar to form angles ABC, at the same time allowing arm T to slide through sheath $N_1$. Then for each value of angle ABC, AB is the cotangent, and BC is the cosecant, of the angle ABC.

In the description of some of the uses of my trinometer I have generally used the arm O to measure altitude of triangles. So also may either of the arms U and T be used to measure altitudes. For instance O is used to measure the altitude of a triangle ABC; U to measure the altitude of a triangle DBC; and T to measure the altitude of a triangle DAC.

In the drawings the circular scales are shown graduated in degrees. The graduations between the zeros of the scale W adjacent to arm U may be numbered in any convenient way or left blank. On these graduations the angles enclosed by the arms may be read approximately. The graduations of the straight scales may be in any preferred units. In those cases when the protractor $J_2$ is made slidable on the rear of the base-bar, a scale, corresponding to the scale H, is engraved on the top of the base-bar for convenience in reading the position of the protractor with reference to the zero of H. Or, if it is preferred, a scale similar to H, and corresponding with it, is engraved on the back of the base-bar. It will be understood that when protractor $J_2$ (or mechanism A) is made slidable on the rear of the base-bar, it is provided with a vernier similar to the verniers K and $K_1$.

The accuracy of my trinometer, and the accuracy of the solution of any triangle is tested at all times; since the instrument shows the three angles of the triangle; and the sum of those three angles must be equal to 180 degrees. For this reason my trinometer has great advantages over any instrument in which the third angle must be found by subtracting the sum of two angles from 180 degrees.

A triangle, or any geometric figure, is bounded by lines; not by members having breadth and thickness. The parts of an instrument must have breadth and thickness, as well as length; and the instrument such as my trinometer is constructed so that its measuring parts are in fact lines lying upon one face or another of the several members of the instrument. For instance: in Figure 1 of the drawings the arms O, U, and T have length, breadth, and thickness; but for an understanding of the use of the instrument they may be assumed to be graduated straight lines pivoted together at a common point. (The graduated edges of the arms, produced, will pass through the pivot). For structural reasons the base-bar has breadth and thickness; and the protractors attached to the base-bar are mounted with their centers somewhat above it; principally to give a clear sight of the verniers which register the positions of the protractors on the base-bar. But for an understanding of the use of the instrument, the base-bar may be considered to pass through the centers of the protractors, as the line $a$—$b$; and the points of intersection of the arms or lines O, U, and T with the base of the triangle under investigation, are the points of intersection of the said lines O, U, and T with the line $a$—$b$; which line passes through the axes of the protractors. So, geometrically speaking, the lines O, U, and T pass through the center of pivot Z; and they also pass and slide through, and turn about, the centers of the protractors J, $J_1$, and $J_2$, which centers lie on, and are adjustable with reference to one another on, the line $a$—$b$; which line is the base of the triangle or triangles under investigation when the lines O, U, and T are the sides. The protractors are shown annular in form. The shape is immaterial, for a protractor is an instrument graduated for the purpose of measuring angles; and it may be of any external shape so long as it offers a plane surface on which angular graduations may be marked. The center of the protractor is the point from which the angular graduations radiate. The sheaths N, N₁, and N₂ through which arms O, U, and T, are slidable, are merely means for holding the sliding lines O, U, and T, on the centers of the protractors; and so that the lines O, U, and T may be rotated about the protractor centers on which they lie. I have termed the protractors J, J₁ and J₂ the base-bar protractors, as their centers are points in the base of the triangle or triangles under investigation. The protractor V shown in Figure 1 I term the floating protractor, as it may be moved, with the arm pivot, to the right or left of the position shown, or nearer to or further away from the base-bar, while remaining in the plane of the instrument.

In graduating the arms O, U and T I measure from zero at the center of the pivot Z. In graduating the base-bar I prefer to place the zero at a point midway of the base-bar; or where protractor J₂ is fixed, at a point projected perpendicularly by line c—d onto the base-bar from the center of J₂. The zeros of verniers K and K₁ are projected perpendicularly to the base-bar from the centers of protractors J and J₁.

In the description of my instrument I have used the capital letters A, B, C, and D to designate the points of intersection of lines forming the triangle or triangles under investigation; as for instance the point A, the point of intersection between line U and line a—b; the point B, the point of intersection between line T and the line a—b; the point C, the point of intersection between the three lines O, U, and T; the point D, the point of intersection between the line O and the line a—b. I have so designated these points because it is customary to so designate similar points in geometry. For the sake of simplifying the description I have also designated the assembled protractors and their parts as "mechanisms." For instance: the assembled protractor J₁ at the point B is designated as the mechanism B; the assembled protractor J₂ and its parts located at the point A is designated as the mechanism A. This method of designating the points of the triangles, and the mechanism assembled at these points, makes the description of the instrument shorter and more easily understandable by the reader.

I claim:

1. In an instrument of the class described: a plurality of graduated arms pivoted together at one end; means for measuring the angular relations of the arms to one another; an added graduated arm, means for adjustably attaching said added arm to the pivoted arms so that the lengths of the pivoted arms intercepted between their common pivot and their points of intersection with the added arm may be varied and so that the distances apart of the points of intersection of the pivoted arms with the added arm may be varied; and means for measuring the angular relations of the pivoted arms to the added arm.

2. In an instrument of the class described: a graduated base-bar; a plurality of sliding members adjustably arranged on the base-bar; sheaths pivoted on the sliding members and so arranged that the pivots of the sheaths are in one plane; a plurality of graduated arms pivoted together at one end, and arranged to slide in the sheaths; means for measuring the angular relations of the arms to one another; and means for measuring the angular relations of the arms to the plane of the sheath pivots.

3. In an instrument of the class described: a graduated base-bar; a plurality of protractors slidably mounted in line on the base-bar; means for registering the relative positions of the protractors on the base-bar; sheaths pivotally mounted on the centers of the base-bar protractors; a floating protractor arranged to one side of the base-bar; a plurality of graduated arms pivoted at one end to each other and to the center of the said floating protractor, and adapted to slide in the sheaths over the centers of the base-bar protractors; and means for measuring the angular relations of the arms to the plane passing through the centers of the base-bar protractors.

4. In an instrument of the class described: a graduated base-bar; two protractors mounted on the base-bar, and adjustable as to their distance from one another; pivots arranged on the centers of the two protractors; two graduated arms pivoted together at one end and slidably mounted on the protractor pivots so that the lengths of the arms intercepted between the arm pivot and the protractor pivots may be varied, and so that the angular relations between the arms and the plane of the pivots may be varied; means for measuring the angular relations between the arms; another protractor mounted on the base-bar, its center in line with the centers of the other protractors; a pivot arranged on the center of the third protractor; a graduated arm pivoted at a common point with the first two arms and slidably mounted on the pivot of the third protractor so that the length of the third arm intercepted between the arm pivot and the pivot of the third protractor may be varied; means for varying the angular relation of the third arm to the plane of pivots of the protractors; and means for measuring the angular relation between the third arm and the first two arms.

5. In an instrument of the class described: a base-bar; a protractor member fixed on the base-bar; two similar protractors slidably arranged on the base-bar and disposed one on either side of the fixed pivoted protractor; three graduated arms pivoted together at one end; and arranged to slide on and turn about the centers of the protractors on the base-bar; and means for fixing the angular relations of any one of the arms with any other arm and with the base-bar.

6. In an instrument of the class described: the instrument as described in claim 5; and means for fixing the lengths of arm or of base-bar intercepted between the pivots.

7. In an instrument of the class described: a base-bar; a protractor fixed on the base-bar; two similar protractors slidably mounted on the base-bar, and disposed one on either side of the fixed protractor; sheaths pivotally mounted on the centers of the protractors; means for fixing the angular relations of the sheaths to the protractors; three arms pivoted together at one end, and adapted to engage in the sheaths; means for locking the three arms in their angular relation to one another; the arrangement of the arms being such that the lengths of the sides of the triangles formed by the arms and the base-bar may be varied without changing the angular relations of the arms to one another and to the base-bar.

8. In an instrument of the class described: a graduated base-bar having two scales extending along its length in opposite directions, the zeros of the two scales coinciding on one line; a protractor mounted on the base-bar and having its center registering with the zero of the base-bar scales; two protractors mounted slidably on the base-bar so that they may pass the first protractor, and so that a line passing through he centers of the three protractors lies in a plane parallel to the base-bar; means for fixing each of the sliding protractors in position independently; sheaths pivotally mounted on the centers of the protractors; means for measuring the angularity of each sheath with the plane passing through the centers of the protractors; means for fixing the angular position of each sheath; a graduated arm slidably mounted in the sheath on the first protractor; means for fixing the arm in the sheath; two graduated arms pivoted to the first arm at one end, and slidably mounted in the sheaths on the slidably mounted protractors; means for fixing the arms in the sheaths on the slidably mounted protractors; means for measuring the angularity of the three arms to one another; means for fixing the angular position of the first arm to each of the other arms independently; and means for fixing the relative positions of the three arms together.

9. In an instrument of the class described: a graduated base-bar; two protractors slidably mounted on the base-bar; sheaths pivotally mounted on the centers of the protractors; a floating protractor located to one side of the base-bar; a sheath pivotally mounted on the center of the floating protractor; two graduated arms pivoted together at one end and slidably mounted, one in the sheath on one of the base-bar protractors, and the other in the sheath on the floating protractor; a third graduated arm pivoted on the center of the floating protractor and slidably mounted in the sheath on the other base-bar protractor; the three arms and the base-bar forming a quadrilateral figure; means for measuring the lengths of the arms and the base-bar intercepted between the pivots; and means for measuring the angles included between the four sides of the figure.

In testimony whereof I have hereunto affixed my signature.

JOSEPH EUGENE ROWE.